2,768,901

CERAMIC DIELECTRIC MATERIALS AND METHODS OF PRODUCING THE SAME

Nigel Conrad Tombs, Wembley, England, assignor to Hazeltine Research, Inc., Chicago, Ill., a corporation of Illinois No Drawing. Application May 22, 1951, Serial No. 227,747

Claims priority, application Great Britain May 26, 1950

1 Claim. (Cl. 106—39)

This invention relates to ceramic dielectric materials of the class having high dielectric constants and low power factors and particularly to such materials comprising one or more of the titanates, zirconates, and stannates of one or more of the alkaline earth metals barium, calcium and strontium. The invention relates also to the process of manufacturing ceramic dielectric materials of the type specified.

Dielectric materials of the class with which this invention is concerned are useful in certain electrical applications, for example, as the dielectric media in condensers, especially condensers for use at radio frequencies. In such applications it is desirable that the power factor of the dielectric medium should be as low as possible. It has been found, however, that in the cases of some of the dielectric materials referred to above, there is a tendency for some chemical reduction to take place when the material is heated during manufacture, with the result that the power factor of the product is somewhat higher than the desired value. For example, bodies formed of barium titanate which has been fired at temperatures of from 1350° C. to 1400° C. have been found to have power factors considerably greater than 0.01 measured at room temperature and at a frequency of 10 kilocycles per second.

It has been found, in accordance with the present invention, that a considerable reduction in the power factors of the alkaline earth metal titanates, zirconates, and stannates, without an excessive reduction in the dielectric constants, is effected by incorporating in a solid solution of such materials a proportion of one or more of the titanates, zirconates, and stannates, of zinc and cadmium.

It is, therefore, an object of the present invention to provide new and improved ceramic dielectric materials.

It is also an object of the present invention to provide new and improved ceramic dielectric materials having improved power factors without substantial depreciation of their dielectric characteristics.

It is a further object of the present invention to provide a new and improved method of producing ceramic dielectric materials.

It is an additional object of the present invention to provide a method of regulating the dielectric properties of the alkaline earth metal titanates, zirconates, and stannates within a wide range, thereby causing these materials to be suitable for a wide variety of applications.

The term "solid solution" as used above and hereinafter is employed in accordance with its accepted technical meaning to the effect that the composition designated thereby is not one having distinctive solute and solvent materials as in conventional mixtures, but is one in which the crystals of the composition are substantially homogeneous. Such a composition has physical and chemical properties and characteristics distinctive from those of the compounds effectively combined to form the solid solution. Alloys are an example of a class of such solid solutions. In such solid solutions the compositions of the final products, with the existing state of knowledge, cannot be stated accurately at this time. Thus, it is desirable herein to designate such final compositions or solid solutions in terms of the properties of the materials either actually or effectively combined to obtain such solid solutions.

In accordance with the invention, the method of producing a ceramic material comprises mixing under acetone substantially 280 grams of barium hydroxide, substantially 11 grams of calcium carbonate, substantially 71 grams of titanium dioxide and substantially 16.5 grams of stannic oxide, drying that mixture and sintering the dried mixture for approximately two hours at approximately 1000° C., grinding the sintered mixture for approximately twenty hours under acetone to produce a resultant mixture. The method further comprises drying the resultant mixture and pressing it into disc form, sintering the formed disc for approximately one hour at approximately 1245° C. to form a solid solution, breaking the formed disc into fragments and grinding those fragments in a dried state for approximately ten hours. The method additionally comprises pressing the ground fragments into another disc, sintering that other disc at approximately 1385° C. to form a ceramic dielectric material consisting of 89 mol percent barium metatitanate and 11 mol percent calcium metatstannate.

For a better understanding of the present invention, together with other and further objects thereof, reference is had to the following description, and its scope will be pointed out in the appended claim.

It is to be understood that the oxides of the alkaline earth metals, the oxides of titanium dioxide, zirconium dioxide and stannic oxide and the oxides of the metals zinc and cadmium employed as above in the production of the ceramic dielectric materials are reacted together in the solid state, no liquids being employed. For example, the alkaline earth metal may be introduced in the form of its hydrated hydroxide and the acid in the form of an oxide of the acid metal (titanium, zirconium and tin), or both may be oxides.

It is also to be understood that the titanates, zirconates and stannates referred to herein are the metatitanates, metazirconates, and metastannates represented by the generalized formula $MTiO_3$, $MZrO_3$ and $MSnO_3$, respectively, where M represents a divalent metal.

Referring now more specifically to the chemical elements utilized, the zinc or cadmium compound or compounds used to produce the ceramic dielectric material, as will be described in more detail hereinafter, are not necessarily the compound or compounds having the same acid radicals as those of the alkaline earth metal compound or compounds present, provided that all the compounds used are capable of forming solid solutions with one another so that the composition obtained is a homogeneous solid solution.

The proportion of the zinc or cadmium compound or compounds used should be such as to form a solid solution with the alkaline earth metal compound or compounds which form the major proportion of the dielectric material. It is in general preferable to avoid using a high proportion of the zinc or cadmium compound or compounds since the presence of such a proportion usually produces a diminution of the dielectric constant of the product. Thus the proportion of zinc or cadmium compounds used should be such as to produce a suitable reduction in the power factor without an unduly large reduction in the dielectric constant. For example, in the case of titanates the proportion of zinc titanate employed should be at least 0.5 mol percent of the material and is preferably between 1 mol percent and 5 mol percent, although a higher proportion may be used if a considerable reduction in the dielectric constant is not objectionable. It has been found that barium titanate containing 1 mol percent of zinc titanate has a power factor of less than 0.01 and a dielectric constant of about 1,100.

The ceramic dielectric materials according to the invention may, if desired, contain the titanates, zirconates, or stannates of other metals in addition to those of the alkaline earth metals and zinc and cadmium, provided that the presence of such additional metals does not have a deleterious effect on the electrical properties of the material; for example, the titanate materials may contain lead titanate.

In the preferred method of manufacturing the dielectric materials according to the invention, a mixture of compounds capable of forming the required titanates, zirconates, and stannates is heated, preferably in air, and pressed into the required shape and is then sintered at a suitable high temperature such that the mixture does not melt as a whole. The preferred starting materials are the oxides of the alkaline earth metal or metals, zinc and/or cadmium, and of titanium, zirconium, and tin or two more of these as required. Alternatively, compounds which are readily converted to the oxides on heating, especially hydroxides and carbonates, may be employed. For the manufacture of the titanate materials the heating is carried out at a temperature between 1250° C. and 1450° C., preferably between 1350° C. and 1400° C.

The use of zinc titanate, zirconate, or stannate as the additive in accordance with the invention is in general preferred to the use of the corresponding cadmium compounds owing to the practical difficulties which may arise as a result of the marked volatility of cadmium oxide. Thus when cadmium titanate, zirconate, or stannate is to be incorporated in the alkaline earth metal titanates, zirconates, and stannates, it has been found that it is usually preferable to carry out the sintering in an atmosphere containing cadmium oxide vapor in order to insure that the required proportion of cadmium oxide is retained in the heated mixture.

The sintered masses produced by the above method may be employed in the shape in which they are formed. For example, discs for use as condenser dielectrics may be prepared directly in this manner or, alternatively, in the manufacture of dielectric compositions for a variety of uses, the sintered masses may be ground and mixed with any suitable binder materials such as synthetic resins.

Methods of manufacturing a ceramic dielectric material according to the invention will now be described by way of example. By one method, 312 grams of barium hydroxide $Ba(OH)_2 \cdot 8H_2O$, 0.8 gram of zinc oxide $ZnO$ and 80 grams of titanium dioxide $TiO_2$ are mixed thoroughly and the mixture is pressed in the form of discs. The discs are supported on a block of refractory material and sintered in air at a temperature of 1385° C. for two hours to produce a dielectric material consisting of a solid solution of 1 mol percent zinc titanate $ZnTiO_3$ in 99 mols percent of barium titanate $BaTiO_3$.

By another method, 280 grams of barium hydroxide $Ba(OH)_2 \cdot 8H_2O$, 11 grams of calcium carbonate $CaCO_3$, 71 grams of titanium dioxide $TiO_2$, and 16.5 grams of stannic oxide $SnO_2$ are mixed and ground together in a mortar after acetone, dried, and sintered for two hours at 1000° C. The sintered mixture is ground for 20 hours under acetone, dried and pressed into discs which are then sintered for one hour at 1245° C. The discs are then broken into fragments which are ground dry for 10 hours, and again the material is pressed into discs which are sintered at 1385° C. This process produces a ceramic dielectric material consisting of 89 mol percent $BaTiO_3$ and 11 mol percent $CaSnO_3$. If it is desired to produce a mixture containing zinc-titanate, 5 mol percent of the total mixture just described is replaced by zinc titanate. The latter compound is developed in the mixture by introducing therein appropriate amounts of zinc oxide and titanium dioxide after the step of sintering for two hours at 1000° C. The process is then completed as previously described.

The process just described, involving two sintering steps in which the material is molded prior to the second sintering step, achieves a high degree of mixing and interaction of the raw materials. This process has been found to give satisfactory results with the particular stannate containing materials described above. It is to be understood that such a process is an example of a preferred method of preparing the ceramic dielectric materials in accordance with the invention and it will be appreciated that modifications of the sintering times and of the temperatures should be utilized for different compositions. The temperature should be so adjusted in each case that the materials will interact and sinter. Such temperatures, as indicated above, are in excess of 1000° C. and preferably between 1250° C. and 1450° C.

A number of titanates, all made by the methods described above by way of example and varying only by the use of the appropriate proportions of starting materials according to the composition required are shown in the following table (Table I), wherein the composition of each material together with its dielectric constant and power factor are given. The dielectric constants and power factors were measured in every case at room temperature and at a frequency of 10 kilocycles per second. In each of the sections A, B, C and D of the table, the properties of the corresponding material without the addition of zinc titanate are given, for comparison with the zinc-containing material. Section A of the table relates to materials derived from barium titanate alone while sections B, C and D relate to materials derived, respectively, from a solid solution of barium titanate and strontium titanate, a solid solution of barium titanate and lead titanate and a solid solution of barium titanate and calcium stannate, in the proportions specified in the first column. Each of the zinc-containing materials indicated in sections A, B, C and D is derived by replacing the total composition given in the first column, to the extent indicated in the second column, by zinc titanate.

*Table I*

| Composition of original material | Mol Percent of whole replaced by $ZnTiO_3$ | Measured at 10 kc./s. and at room temperature | |
|---|---|---|---|
| | | Dielectric Constant | Power Factor |
| A | | | |
| 100 mol percent $BaTiO_3$ | 0 | 1,300 | 0.02 |
| | 1 | 1,120 | 0.0078 |
| | 2.5 | 760 | 0.0039 |
| | 5 | 650 | 0.0020 |
| B | | | |
| 68.3 mol percent $BaTiO_3$ | 0 | 3,500 | 0.03 |
| 31.7 mol percent $SrTiO_3$ | 5 | 5,030 | 0.0095 |
| C | | | |
| 96 mol percent $BaTiO_3$ | 0 | 2,000 | 0.036 |
| 4 mol percent $PbTiO_3$ | 1 | 980 | 0.0085 |
| | 2.5 | 1,110 | 0.0040 |
| D | | | |
| 89 mol percent $BaTiO_3$ | 0 | 4,050 | 0.023 |
| 11 mol percent $CaSnO_3$ | 5 | 4,600 | 0.009 |

Table II, below, shows in a similar manner the effect of incorporating varying small proportions of cadmium titanate in barium titanate. These cadmium-containing materials were prepared in a similar manner to the zinc-containing materials described above.

Table II

| Original material | Mol Percent of BaTiO₃ replaced by CdTiO₃ | Measured at 10 kc./s. and at room temperature | |
|---|---|---|---|
| | | Dielectric Constant | Power Factor |
| 100 mol percent BaTiO₃ | 0 | 1,300 | 0.009 |
| | 0.25 | 1,430 | 0.013 |
| | 0.75 | 1,280 | 0.013 |
| | 2.5 | 1,060 | 0.009 |

It will be understood that the values for dielectric constants and power factors included in the above tables are specific for the materials concerned and serve to indicate the variations in these properties caused by the introduction of zinc titanate and cadmium titanate into the alkaline earth metal titanate materials mentioned. It will be found that the precise values for these properties will vary with different samples of the raw materials used, since the absolute values of such properties depend on the purity of the raw materials and the precise methods of mixing, firing and other treatments employed. Moreover, these properties tend to change with the age of the manufactured material.

It will be noted that the figures shown in the table indicate that the introduction of zinc titanate or cadmium titanate into alkaline earth metal titanates does not necessarily result in a decrease in the dielectric constant of the material. In this connection the effect of replacing 5% of the barium-strontium titanate by zinc titanate, and that of increasing the zinc titanate content of the barium-lead titanate is of interest. The net change produced in the dielectric constant through the incorporation of zinc titanate, for example, represents a balance between the following effects: (1) decrease due to dilution by zinc titanate, which itself has a dielectric constant of about 30; (2) decrease due to lowering of the power factor, since a high power factor leads to an inordinately high dielectric constant; (3) increase, due to improved sintering, zinc titanate acting as a flux; (4) increase or decrease, due to modification of the temperature-dependance of dielectric constant.

It has also been discovered that the addition of the zinc and cadmium compounds to complete the solid solution has other additional advantages. These added compounds act as useful flux materials in the manufacture of the ceramic dielectric materials, thereby improving the efficiency of the manufacture thereof.

While there have been described what are at present considered to be the preferred embodiments of this invention, it will be obvious to those skilled in the art that various changes and modifications may be made therein without departing from the invention, and it is, therefore, aimed in the appended claim to cover all such changes and modifications as fall within the true spirit and scope of the invention.

What is claimed is:

The method of producing a ceramic material which comprises: mixing under acetone substantially 280 grams of barium hydroxide, substantially 11 grams of calcium carbonate, substantially 71 grams of titanium dioxide and substantially 16.5 grams of stannic oxide; drying said mixture and sintering the dried mixture for approximately two hours at approximately 1000° C.; grinding said sintered mixture for approximately twenty hours under acetone to produce a resultant mixture; drying said resultant mixture and pressing it into disc form; sintering said formed disc for approximately one hour at approximately 1245° C. to form a solid solution; breaking said formed disc into fragments and grinding said fragments in a dry state for approximately ten hours; pressing said ground fragments into another disc; and sintering said other disc at approximately 1385° C. to form a ceramic dielectric material consisting of 89 mol percent barium metatitanate and 11 mol percent calcium metastannate.

References Cited in the file of this patent

UNITED STATES PATENTS

| 2,369,327 | Wainer | Feb. 13, 1945 |
| 2,643,192 | Jonker et al. | June 23, 1953 |

FOREIGN PATENTS

| 574,577 | Great Britain | 1946 |